(No Model.)
J. J. VINTON.
FENCE POST.
No. 317,896. Patented May 12, 1885.
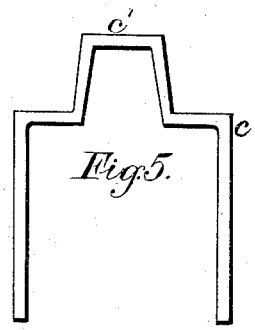
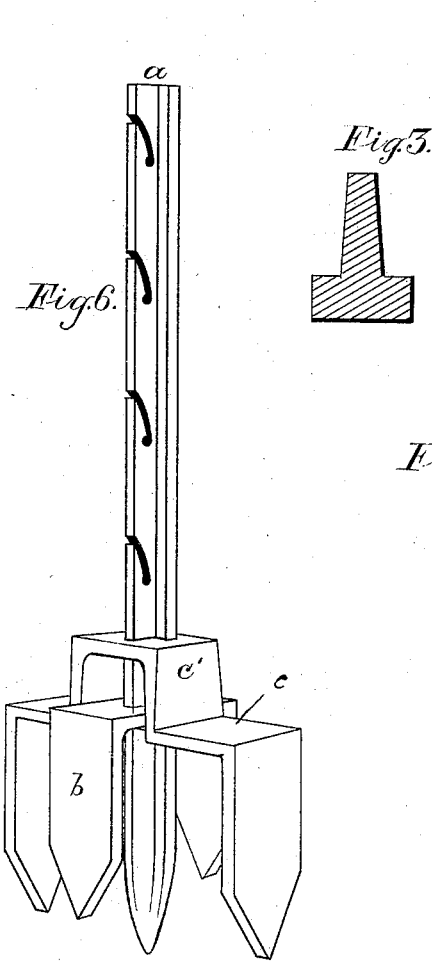
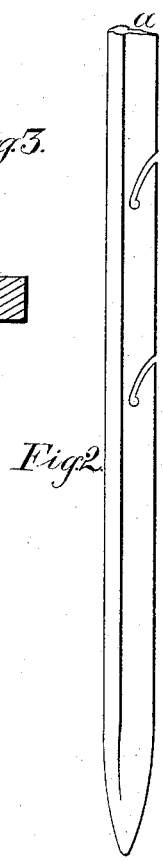
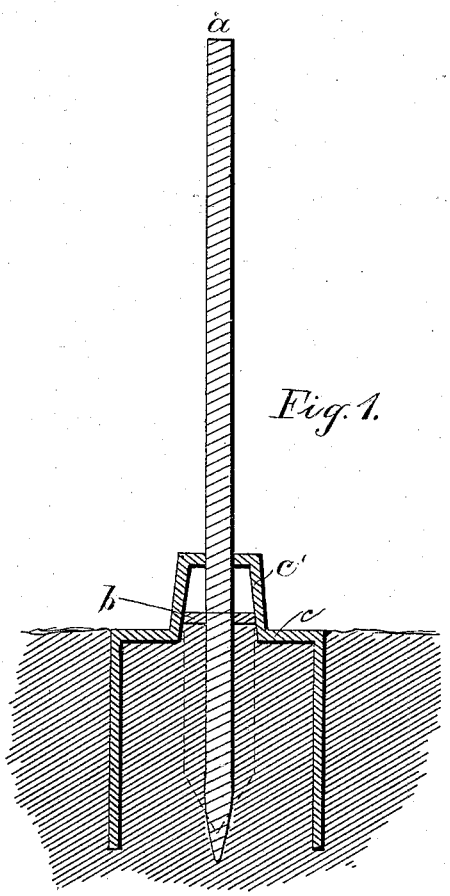
Witnesses:
G. S. Rafter
T. J. Hudson
Inventor:
John J. Vinton
By S. W. Ginsabaugh
Attys.

UNITED STATES PATENT OFFICE.

JOHN J. VINTON, OF YOUNGSTOWN, OHIO.

FENCE-POST.

SPECIFICATION forming part of Letters Patent No. 317,896, dated May 12, 1885.

Application filed December 2, 1884. (No model.)

*To all whom it may concern:*

Be it known that I, JOHN J. VINTON, a citizen of the United States, residing at Youngstown, in the county of Mahoning and State of Ohio, have invented certain new and useful Improvements in Fence-Posts; and I do hereby declare the following to be a full, clear, and exact description of my invention, such as will enable others skilled in the art to which it appertains to make and use the same, reference being had to the accompanying drawings, which form a part of this specification.

This invention relates to certain improvements in fence-posts and supports for the same, whereby the fence-posts may be readily secured in the ground so as to prevent the removal thereof from ordinary or accidental strains, and at the same time to permit the said posts to be readily inserted and held securely in place, and permit their removal for repairs, as more fully hereinafter specified. These objects I attain by the means illustrated in the accompanying drawings, in which—

Figure 1 represents a vertical sectional view of the fence-post and its supports, showing the same in position. Fig. 2 represents a perspective view of the fence-post proper; Fig. 3, a transverse horizontal sectional view of the fence-post; Fig. 4, a detached view of a portion of the support of the fence-post; Fig. 5, a similar view of a portion of the fence-post support which is set at right angles to the portion shown in Fig. 4; and Fig. 6 a perspective view showing the fence-post and its supports as connected and in position.

The letter $a$ indicates the fence-post, which is T-shaped in cross or horizontal section, and which is pointed or sharpened at its lower end, so as to be readily driven into the ground.

The letter $b$ indicates one portion of the base or support, which consists of a metallic section having a horizontal shoulder and downwardly-depending members, which are sharpened or pointed at their ends so as to be readily driven into the ground. The shoulder of such section is provided at a point intermediate between its ends with an aperture corresponding to the shape of the fence-post in cross-section, so that said post may be passed through the same and closely held thereby.

The letter $c$ indicates another section of the base or support, which is arched, as indicated by the letter $c'$, so as to straddle the section $b$, as plainly shown in Fig. 6 of the drawings. The said section $c$ is provided at its upper part with an aperture, made to conform to the shape of the post in cross-section, so as to permit the post to pass through the same and be driven into the ground, and the said section $c$ is provided with dependent sharpened or pointed ends, by means of which it may be driven into the ground. The sides of the arched portion spread outwardly, from the top downward, so that the shoulder of the section $b$ will be locked in the lower part of the arch when the parts are driven in the ground, thus firmly securing the same together and forming a rigid support for the post at two points, one above the other. The web of the post, at suitable intervals, is provided with oblique slots, terminating in recesses for the reception of the fence-wires, as shown in Figs. 2 and 6 of the drawing.

The fence-post and its supports are intended to be formed wholly of metal, preferably of cast metal for the purpose of economy.

As constructed it will be seen that the parts—that is, the fence-post and the supports—may be readily driven into the ground so as to be securely fastened therein against lateral pressure in any direction, which will be the only line of natural or accidental strain, while at the same time the parts may be readily withdrawn in a vertical direction for repairs or other purposes.

Having thus described my invention, what I claim, and desire to secure by Letters Patent, is—

The combination, with the T-shaped pointed fence-post, of the anchor consisting of the shouldered section $b$, pointed at the lower ends, and provided with a T-shaped aperture for the post, and the section $c$, pointed at its ends and having an arch, $c'$, widening from the top down so as to lock the section $b$ and form two rigid supports for the post, the arched portion being provided with a T-shaped aperture through which the post passes, substantially as specified.

In testimony whereof I have hereunto affixed my signature in the presence of two witnesses.

JOHN J. VINTON.

In presence of—
GEORGE DANIEL,
B. F. WIRT.